United States Patent [19]

Ahmed et al.

[11] Patent Number: 5,038,086
[45] Date of Patent: Aug. 6, 1991

[54] POWER SEAT, IMPROVED ROTARY SWITCH SYSTEM THEREFOR

[75] Inventors: Moin Ahmed, Madison Heights; Joseph J. Umpirowicz, Northville, both of Mich.

[73] Assignee: Chrysler Corporation, Highland Park, Mich.

[21] Appl. No.: 520,928

[22] Filed: May 9, 1990

[51] Int. Cl.⁵ ............................................. H02P 1/22
[52] U.S. Cl. ................................... 318/286; 318/264; 318/266; 318/468
[58] Field of Search .............. 318/255, 256, 264, 265, 318/266, 286, 468, 51, 111, 112; 307/9.1, 10.1

[56] References Cited

U.S. PATENT DOCUMENTS

| 4,267,490 | 5/1981 | Thiene | 318/51 |
| 4,288,726 | 9/1981 | Vazquez-Cuervo et al. | 318/51 X |
| 4,510,426 | 4/1985 | Michaels et al. | 318/565 |
| 4,644,232 | 2/1987 | Nojiri et al. | 318/66 |
| 4,795,862 | 1/1989 | Linden | 200/6 A |
| 4,975,547 | 12/1990 | Nakayama et al. | 200/5 R |

Primary Examiner—Bentsu Ro
Attorney, Agent, or Firm—Wendell K. Fredericks

[57] ABSTRACT

Operation of eight motors to control two power seats of a vehicle is effected by three rocker arm type switches, one "joy stick" type switch and a seat select switch. Each seat can be moved in ten different directions.

4 Claims, 3 Drawing Sheets

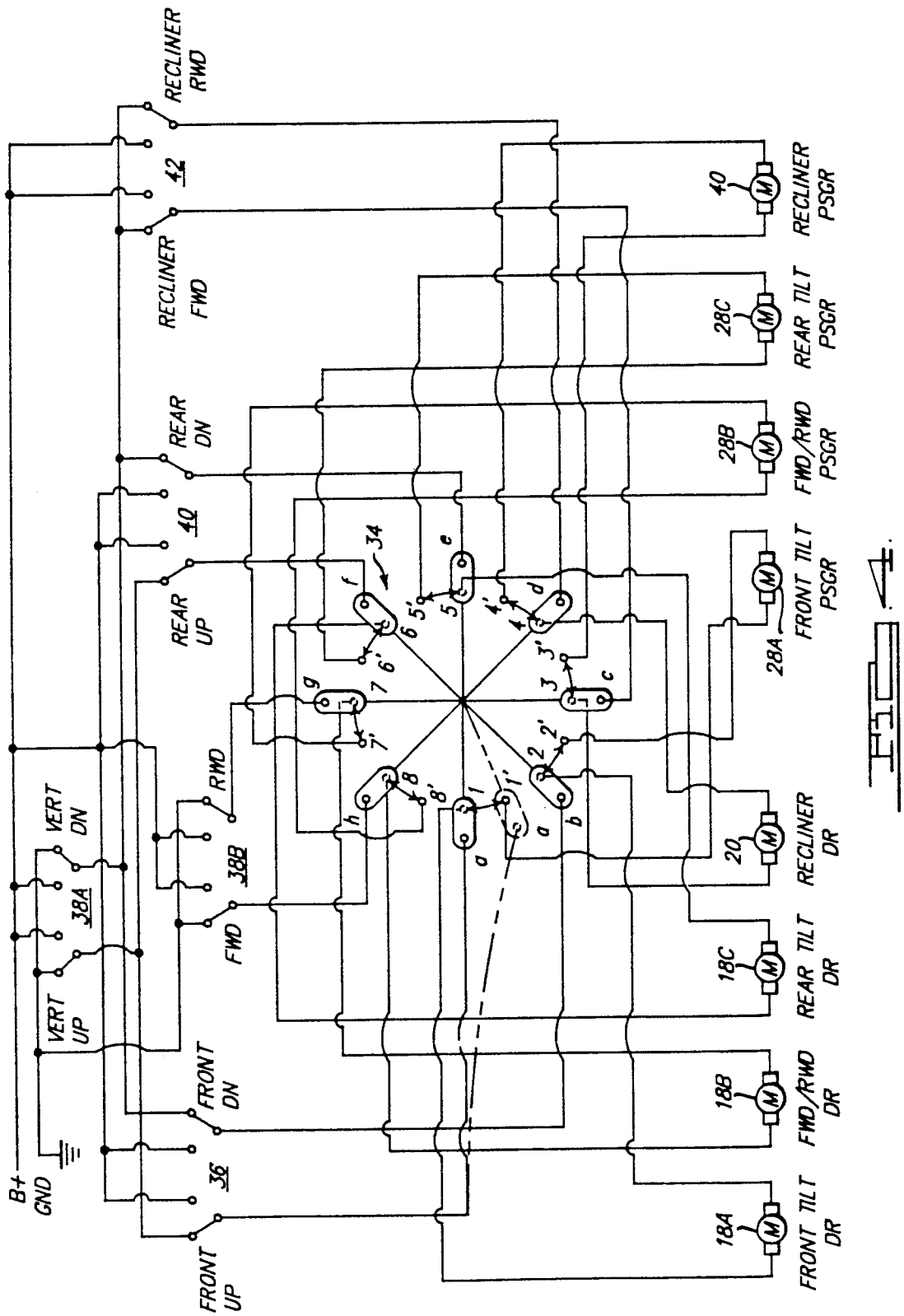

5,038,086

POWER SEAT, IMPROVED ROTARY SWITCH SYSTEM THEREFOR

FIELD OF THE INVENTION

The present invention relates generally to novel switch systems for controlling power seats, and particularly to switch systems employing rotary switches and four-way type "joy-stick" switches in conjunction with a minimum number of rocker-type switches to control a plurality of motors and power-seat adjustments.

BACKGROUND OF THE INVENTION

Conventional power-seat systems provide for adjusting the driver and passenger seat to a variety of positions.

One common arrangement permits adjusting these seats in six different directions. Three reversible motors operate each power seat. Different motors operate to control movement of the front and the back of each seat, e.g, independently raising and lowering the front or rear of each seat.

A pair of control switch assemblies for this arrangement, located on the lower outboard side of the driver and passenger seats, control the operation of the seat motors. A front rocker-type switch in each assembly raises or lowers (tilts) the front of the seat. A middle 4-way "joy-stick" type lever in the assembly raises or lowers the complete seat by moving the lever up or down. The middle lever also moves the complete seat forward or rearward by moving the lever forward or rearward. A rear rocker-type switch in the assembly raises or lowers the back of the seat.

Such an arrangement requires individual switch assemblies for each seat. Within the assembly, a separate switch controls an individual motor. Hence, six switches and six motors provide means for controlling driver and passenger seat movement in six different directions.

A co-pending application of the present inventors, Ser. No. 07/520,920, filed on even date teaches using a rotary switch to select the driver or the passenger power seat and then use individual switches to control movement of the selected seat. This approach limits movement to eight different directions, but other arrangements are required to expand the capabilities of the system.

Hence, to add movement of the seat in other directions, such as reclining the back seat, would require additional motors, wires and switches and motion control gearing to effect the movement.

In an effort to minimize the need for additional components to achieve additional power-seat orientations, a search was initiated to find other schemes for power-seat control. That search ended in the improved power-seat switch control presented in the instant invention.

SUMMARY OF THE INVENTION

The present invention is concerned with an improved switch system for controlling the operation of power-seat motors. A two-position rotary switch permits coupling input and output terminals of all the motors associated with a driver and a passenger power seat and the selection of the terminals of the motors associated with either the driver seat or the passenger seat. Once the seat is selected, front tilt, rear tilt, recline movement of the selected seat can be effected by pressing appropriately chosen rocker type switches and horizontal and vertical movement of the selected seat can be effected by moving a "joystick" type switch in four directions.

IN THE DRAWINGS

FIG. 4 depicts, in schematic form, the power-seat switch control system of the present invention that includes a rotary select switch and a "joy stick" type switch.

DETAILED DESCRIPTION OF A PREFERRED EMBODIMENT

Figure 1:
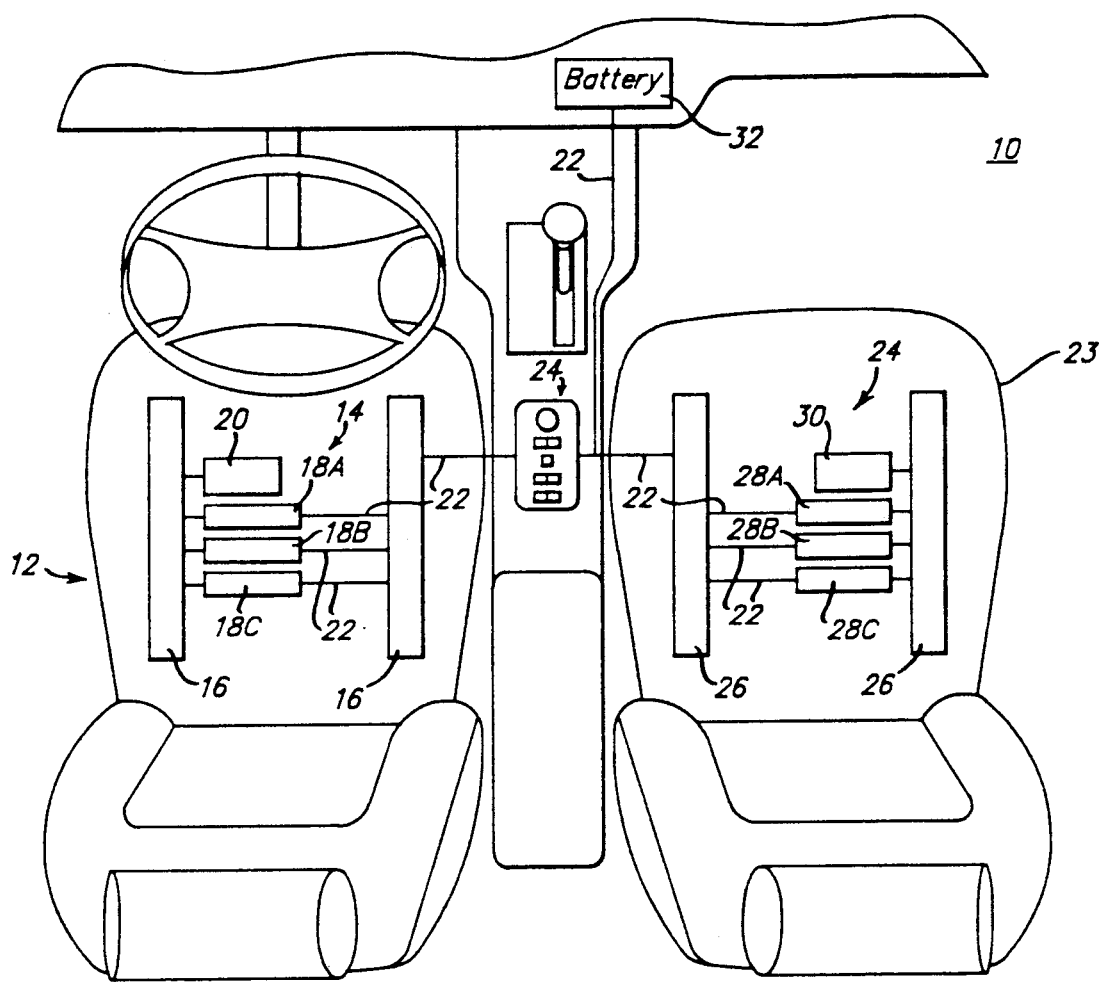
FIG. 1 illustrates a cutaway top view of a driver and passenger power-seat switch control system of the present invention.

With reference to FIG. 1, this figure depicts a cutaway, top view of the interior of the front seats of a vehicle containing a rotary switch power-seat assembly 10 of this invention.

Within driver seat 12 mounts motor-power means 14 comprised of conventional transmission-type, power-seat adjuster assemblies 16—16 mounted in the seat tracks; three power-seat motors 18 A, B and C and a power recliner motor 20 with connecting cables 22 linking the motors to the seat adjusters 16—16 and to a centrally located control switch assembly 24.

Likewise, within passenger seat 23 mounts motor-power means 24 comprised of conventional transmission-type, power-seat adjuster assemblies 26—26 mounted in the seat tracks; three power-seat motors 28 A, B and C and a power recliner motor 30 with a plurality of cables 22 linking the motors to the seat adjusters 26—26 and to the centrally located control switch assembly 24.

Power to both motor power means come from the vehicle battery 32.

Rather than having individual control switch assemblies for each seat, the centrally located control switch assembly 24 serves as control for the driver and passenger power-seats 12 and 23 respectively.

Figure 2:
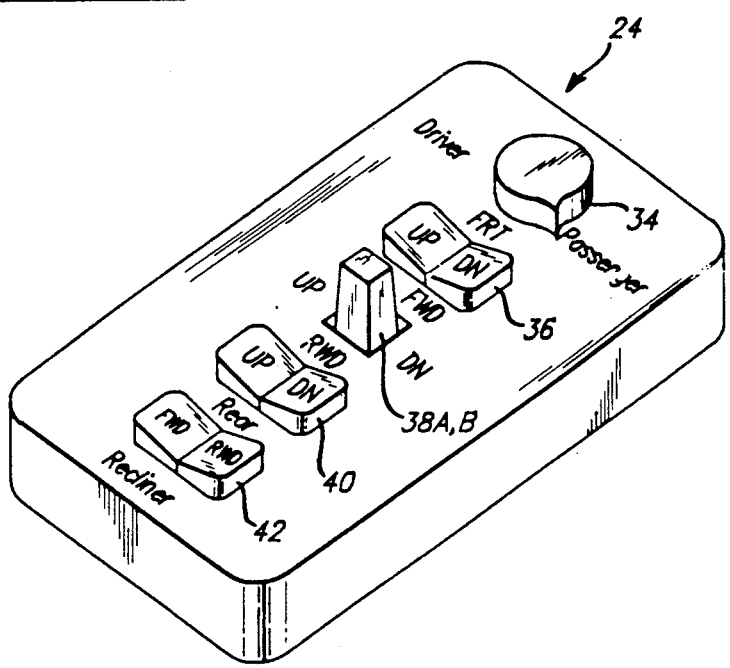
FIG. 2 depicts an exploded view of a control switch assembly of the switch control system of FIG. 1.
Figure 3:
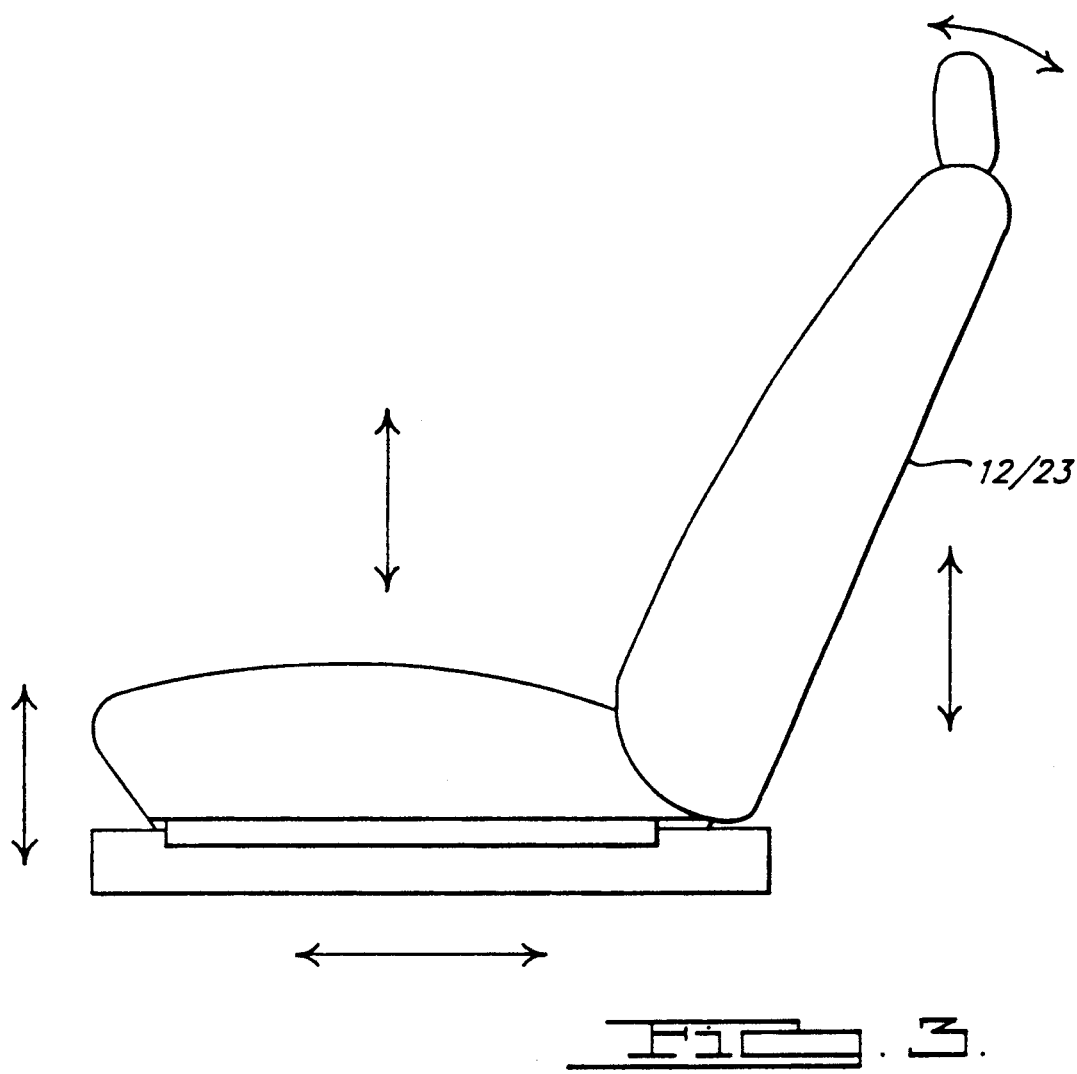
FIG. 3 illustrates, in a side view of the front seats, the plurality of directions the seats can be moved using the switch control assembly of FIG. 2.

FIG. 2 depicts an exploded view of the control switch assembly 24. Switch assembly 24 includes a double-throw, eight pole rotary switch 34, three rocker switches comprised of a pair of single-pole, single-throw switches combined in a single rocker switch namely switches 36 (FRONT), 40 (REAR) and 42 (RECLINER) and a dual-axis, single-lever, four way "joy stick" type switch 38 A(VERTICAL), B (FWD/BWD). As illustrated in side view of seats 12 and 23 of FIG. 3, this arrangement allows for dual use of rocker and the "joy stick" switches for adjusting the driver and passenger seats to ten different directions: up, down, forward, backward, tilt forward, up and down, tilt rearward, up and down, incline forward and incline backward.

Figure 5:
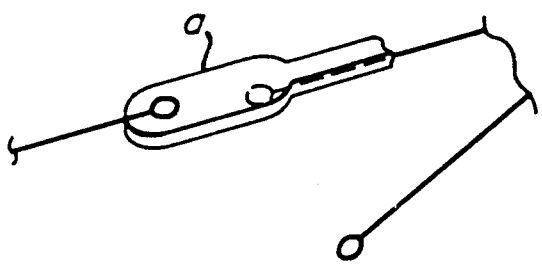
FIG. 5 depicts the relationship of a terminal of the rotary switch and the two poles and wires associated with that terminal.

Rotary switch 34, best illustrated schematically in FIG. 4, has two positions, namely, a driver (numbered poles 1-8) and a passenger (prime number poles $1^1$-$8^1$) position. Wires routing to the numbered and prime numbered poles are fixed and do not move while the wires routing to the lettered (a-h) terminals move with the terminal between the driver and passenger positions. FIG. 5 depicts a movable terminal-a with a wire fixedly attached that moves with terminal-a when the terminal moves between pole 1 and pole 1$^1$.

Switches 36, 40 and 42 are ON-OFF rocker switches B4 series of switch manufacturer Molveno Cometti SPA of Milano Italy which allow for the unpressed side of the rocker switch to remain normally closed when the other side is pressed to make contact with a normally open contact and vice versa.

The "joy stick" switch 38 has a neutral position from which it can be moved either left or right (UP or DN positions) or back or forth (RWD or FWD positions) when the rotary switch is moved to select either the driver or passenger seat.

The rotary switch is a series 600 rotary switch manufactured by Electroswitch of Raleigh, N.C.

The power-seat motors 18 A, B and C and 28 A,B, and C and the power recliner motors 20 and 40 are permanent magnet reversible motors protected by 30 amp circuit breakers (not shown).

OPERATION OF THE SYSTEM

With reference to FIG. 4 and Table 1, an explanation of the operation of the power seats follows.

Power routes through the pressed switch and the selected contacts of the rotary switch 34 to the associated motor. The seat adjusters associated with each motor contain structure which limits movement of the seats along the seat tracks.

To tilt the front of the driver seat down, FRONT switch 36 must be pressed and held in the DN position until the desired downward tilt of the front of the driver seat is achieved.

Likewise, the passenger seat may be tilted in the same manner, but the rotary switch 34 must be rotated to the passenger position before pressing the same rocker switch 36 to achieve the same desired results for that seat.

To tilt up or down the rear of the driver or passenger seat, the rotary switch must be used to select either DR or PSGR, then switch 40 must be appropriately pressed.

To affect reclining the rear of either seat, again rotary switch 34 must be used to select which seat to recline and then switch 42 must be appropriately pressed to cause recline movement in the forward or rearward directions.

To raise either seat, again rotary switch 34 must be used to select which seat to raise and then the "joy stick" switch 38 must be tilted to the left to cause power to route to both the front tilt and rear tilt motors of the

| Seat | Rotary Sw | Joy Stick Vert SW38 Hor | | | | Frt SW 36 | | Rear SW 40 | | Recline SW 42 | | Active Mtr |
|---|---|---|---|---|---|---|---|---|---|---|---|---|
| | | Up | Dn | Fwd | Rwd | Up | Dn | Up | Dn | Fwd | Rwd | |
| Dr Frt Up | a-1 2-b | N | N | N | N | P | N | N | N | N | N | 18A |
| Dr Frt Dn | 1-a b-2 | N | N | N | N | N | P | N | N | N | N | 18A |
| Psgr Frt Up | a-1' 2'-b | N | N | N | N | P | N | N | N | N | N | 28A |
| Psgr Frt Dn | 1'-a b-2' | N | N | N | N | N | P | N | N | N | N | 28A |
| Dr Rear Up | f-6 5-e | N | N | N | N | N | N | P | N | N | N | 18C |
| Dr Rear Dn | 6-f e-5 | N | N | N | N | N | N | N | P | N | N | 18C |
| Psgr Rear Up | f-6' 5'-e | N | N | N | N | N | N | P | N | N | N | 28C |
| Psgr Rear Dn | 6'-f e-5' | N | N | N | N | N | N | N | P | N | N | 28C |
| Dr Vert Up | a-1 2-b | P | N | N | N | N | N | N | N | N | N | 18A |
| | f-6 5-e | | | | | | | | | | | 18C |
| Dr Vert Dn | 1-a b-2 | N | P | N | N | N | N | N | N | N | N | 18A |
| | b-f e-5 | | | | | | | | | | | 18C |
| Psgr Vert Up | a-1' 2'-b | P | N | N | N | N | N | N | N | N | N | 28A |
| | f-6' 5'-e | | | | | | | | | | | 28C |
| Psgr Ver Dn | 1'-a b-2' | N | P | N | N | N | N | N | N | N | N | 28A |
| | 6'-f e-5' | | | | | | | | | | | 28C |
| Dr Fwd | h-8 7-g | N | N | P | N | N | N | N | N | N | N | 18B |
| Dr Rwd | g-7 8-h | N | N | N | P | N | N | N | N | N | N | 18B |
| Psgr Fwd | h-8' 7'-g | N | N | P | N | N | N | N | N | N | N | 28B |
| Psgr Rwd | g-7' 8'-h | N | N | N | P | N | N | N | N | N | N | 28B |
| Dr Recline Fwd | c-3 4-a | N | N | N | N | N | N | N | N | P | N | 20 |
| Dr Recline Rwd | d-4 3-c | N | N | N | N | N | N | N | N | N | P | 20 |
| Psgr Recl Fwd | c-3' 4'-a | N | N | N | N | N | N | N | N | P | N | 40 |
| Psgr Recl Rwd | d-4' 3'-c | N | N | N | N | N | N | N | N | N | P | 40 |

In Table 1, the symbol "P" indicates that the switch is pressed and the symbol "N" indicates that the designated part of the rocker switch is normally closed. The letters and numbers under "Rotary SW" heading designate the terminals of the rotary switch 38 that are employed for the movement described under the heading "seat". System 10 receives operating power (+B and ground) from battery 32 of FIG. 1.

To tilt the front of the driver seat UP, rotary switch 34, a double throw (Max cw-DR position & Max ccw-PSGR position) switch as indicated in Table 1 and shown in FIG. 4 must be rotated to the driver position and then FRONT switch 36 must be pressed and held in the UP position until the desired tilt upward of the front of the driver seat is achieved. None of the other switches requires movement.

selected seat to simultaneously switch power to these motors. Then both the front and the rear of the selected seat will rise to the desired height.

Likewise, to lower either seat, again the rotary switch 34 must be used to select which seat to lower and then the "joy stick" switch 38 must be tilted to the right to simultaneously reverse the power routed to both the front tilt and rear tilt motors of the selected seat.

To move either seat forward or backward, again the rotary switch 34 must be used to select which seat is to be moved and then the "joy stick" switch 38 must be moved either forward or backward to effect movement in those directions.

What is claimed is:

1. An improved power-seat switch control system for controlling movement in a plurality of directions and seat positions of a driver and a passenger front seat for a vehicle, the driver and passenger seats having a plurality of motors positioned under the seats, and connected to receive power from a power source and mated to transmission-type adjusters for affecting movement to and from the plurality of seat positions, said switch control system permitting independent movement of both the driver and passenger seats to each of the plurality of seat positions in accordance to the desires of an operator, said system comprising:

a) a selection switch means for selecting which seat to move, said selection switch means having terminals for making available individual input and an output terminal of each one of the plurality of motors associated with the selected seat;

b) first switch means connected between the power source and said selection switch means for providing either direct or reverse source power to the motor associated with tilting a front edge of the selected seat;

c) second switch means connected between the power source and said selection switch means for providing either direct or reverse source power to the motor associated with tilting a rear edge of the selected seat;

d) third switch means connected between the power source and said selection switch means for providing either direct or reverse source power to the motor associated with reclining a back portion of the selected seat forward or rearward; and e) a "joy stick" switch means connected between the power source and said selection switch means for providing direct or reverse source power to motors associated with moving the selected seat in a vertical plane or in a horizontal plane.

2. Apparatus in accordance with claim 1 wherein said selection switch means is a double throw, eight pole type rotary switch having eight terminals connected to terminals of said first, second and third switch means and said "joy stick" switch means, and sixteen poles connected to the plurality of motors associated with moving the driver and passenger seats.

3. Apparatus in accordance with claim 2 wherein said first, second and third switch means are rocker switches that have two independently operated switch portions, wherein the pressing of one side of the rocker switch does not affect the contact position of the other side of the switch.

4. Apparatus in accordance with claim 3 wherein said "joy stick" switch means is a dual axis switch permitting switch actuation in four directions.

* * * * *